US006981912B2

(12) United States Patent
Cate et al.

(10) Patent No.: US 6,981,912 B2
(45) Date of Patent: Jan. 3, 2006

(54) METHOD AND MEANS FOR FILLING NATURAL CASING SAUSAGES

(75) Inventors: Stephen H. Cate, Johnston, IA (US); Marcellinus F. Ottow, Rosmalen (NL); Steven P. Hergott, West Des Moines, IA (US); Vincent L. Basile, II, West Des Moines, IA (US); Michael S. Simpson, Norwalk, IA (US); David Hamblin, Norwalk, IA (US); Kenneth L. Lebsack, Ankeny, IA (US); Rudolf P. T. Enklaar, Woerden (NL); Jay D. Thomas, Danville, CA (US)

(73) Assignee: Townsend Engineering Company, Des Moines, IA (US)

( * ) Notice: Subject to any disclaimer, the term of this patent is extended or adjusted under 35 U.S.C. 154(b) by 212 days.

(21) Appl. No.: 10/694,335

(22) Filed: Oct. 27, 2003

(65) Prior Publication Data

US 2004/0116059 A1 Jun. 17, 2004

Related U.S. Application Data

(62) Division of application No. 09/674,399, filed on Nov. 26, 2002.

(51) Int. Cl.
*A22C 11/02* (2006.01)

(52) U.S. Cl. .......................................... 452/32; 452/47

(58) Field of Classification Search .................. 452/30, 452/31, 32, 33, 34, 35, 39, 40, 47
See application file for complete search history.

(56) References Cited

U.S. PATENT DOCUMENTS 3,150,410 A * 9/1964 Washburn .................... 452/33
3,191,222 A * 6/1965 Townsend .................... 452/31
3,672,001 A * 6/1972 Greider ....................... 452/31
3,952,370 A 4/1976 Greider
4,434,527 A * 3/1984 Staudenrausch et al. ...... 452/34
4,539,796 A * 9/1985 Nakamura et al. ............ 452/40
4,569,101 A * 2/1986 Tribbett ................... 425/133.1
5,013,279 A * 5/1991 Southworth .................. 452/46
5,092,814 A * 3/1992 Kasai et al. .................. 452/47
5,180,327 A * 1/1993 Kasai et al. .................. 452/47
5,297,983 A * 3/1994 Mueller et al. ............... 452/33
5,372,537 A * 12/1994 Stiles .......................... 452/51
5,480,346 A 1/1996 Kasai et al.
5,813,906 A * 9/1998 Phillips ....................... 452/36
5,813,907 A * 9/1998 Lebsack et al. ............... 452/32
5,830,050 A 11/1998 Nakamura
5,842,914 A * 12/1998 Vermeer et al. .............. 452/47
5,951,391 A * 9/1999 Hergott et al. ................ 452/46
5,993,307 A * 11/1999 Hamblin ...................... 452/35
6,056,635 A * 5/2000 Vermeer et al. .............. 452/46
6,066,035 A * 5/2000 Hergott et al. ................ 452/31
6,146,261 A 11/2000 Bienert et al.

FOREIGN PATENT DOCUMENTS

EP 0399582 * 11/1990

(Continued)

*Primary Examiner*—Peter M. Poon
*Assistant Examiner*—David Parsley

(57) ABSTRACT

A method for filling a natural hollow elongated casing with meat emulsion that involves placing a natural casing on an elongated meat emulsion stuffing tube and longitudinally pumping meat emulsion through the stuffing tube for expansive discharge into the natural casing at a sufficient volume and velocity to provide the primary energy within the natural casing. The method also involves providing a casing hopper that can be pivoted from a forward operating position to a rearward inoperative position.

3 Claims, 5 Drawing Sheets

FOREIGN PATENT DOCUMENTS

| | | | |
|---|---|---|---|
| EP | 0568372 A2 | | 3/1993 |
| JP | 2-257824 | * | 10/1990 |
| JP | 6007073 | | 1/1994 |

* cited by examiner 10
12
14
16
18
20
22
26
28
29
36
38
40
42
44
46
48
50
52
54
66
78
2-2
3-3

METHOD AND MEANS FOR FILLING NATURAL CASING SAUSAGES

CROSS REFERENCE TO A RELATED APPLICATION

This application is a division of U.S. Ser. No. 09/674,399 filed Nov. 26, 2002.

This application is based upon the applicants' provisional application Ser. No. 60,127,770 filed Apr. 5, 1999.

BACKGROUND OF THE INVENTION

Sausages have been traditionally made by filling the natural intestines of sheep, for example, with the sausage meat product whereupon the filled natural casing was formed into links for cooking by the consumer. In more modern times, sausages are predominantly made by introducing a meat emulsion into an artificial casing which encased the sausage material through linking and preliminary cooking whereupon the casings are peeled from the sausage before being sold to the consumer. Machines for making sausages with artificial casings have a high volume capability (up to 30,000 sausages per hour). Efforts have been made to use these high speed machines with natural casings. However, because of the nature of the natural casings including their relatively shorter length and non-uniform diameter, modern sausage encasing machines have not achieved the volume and capacity with natural casings as they do with artificial casings.

It is therefore a principal object of this invention to provide a method and machine for filling natural casings which is economical, relatively fast, and easy to accomplish as compared to previous ways of filling natural casings.

A still further object of this invention is to provide a method and a machine for filling natural casings wherein the meat pressure expands the natural casing and pushes the casing forward as the meat emulsion discharges from a conventional hollow stuffing horn.

A further object of this invention is to provide a machine and method for filling a natural casing wherein the filled casing passes through a hollow chuck with a resilient brake therein which impedes the movement of the casing from the stuffer tube and wherein the resilient brake creates a balance between the meat pushing forward on the casing and the brake holding back on the casing, all to create the desired fill or plumpness of the resulting sausage.

A still further object of this invention is to provide a flexible or resilient brake in a hollow chuck through which the filled casing moves in a rotatable twisting head which not only produces a longitudinal drag on the casing to resist forward motion thereof, but also provides a radial rotating course which helps to rotate the casing and thereupon facilitate twisting thereof as the filled sausage casing moves through the linking chains.

A still further object of this invention is to provide a follower or thrust collar on the stuffing tube upstream of the natural casing which is manually and intermittently pushed against the back side of the natural casing which provides a light force to prevent the natural casing from sticking to the tube but does not serve to move the natural casing from the tube, for this is accomplished by the momentum of the meat emulsion filling the casing. This force is insufficient to cause squeezing pressure between the follower and the twisting head.

A still further object of this invention is to provide a method and machine which will permit easy conversion of the machine from the natural casing operation to the artificial casing operation.

A still further object of the invention is to provide a casing clamp and casing hopper on a sausage making machine which can be moved away from the casing filling station at times to accommodate the natural casing mode for the machine.

A still further object of the invention is to provide a method and apparatus for filling a natural casing which has the ability to change the stuffing tube from a full stroke as with artificial casings to a partial stroke for use with natural casings.

A still further object of the invention is to provide a method and machine for filling natural casings which has a thrust collar that can be manually controlled by the operator, or an automatic follower which will duplicate the manual operation by providing a series of intermittent push and release actions to move the unshirred casing forward.

A still further object of the invention is to provide a method and machine to fill natural casings wherein water is present at various stages of the operation to keep the natural casing from becoming dehydrated and to maintain its very soft, pliable and slippery character.

A still further object of the invention is to provide a method and machine for filling natural casings which utilizes a cooling turban as a part of the rotating twister.

These and other objects will be apparent to those skilled in the art.

SUMMARY OF THE INVENTION

A method of filling a natural hollow elongated casing with meat emulsion involves placing a natural casing on an elongated meat emulsion stuffing tube having a meat emulsion discharge end, closing an extended end of the natural casing over the discharge end of the stuffing tube so that meat emulsion exiting the discharge end will push the natural casing longitudinally by pumping meat emulsion through the stuffing tube for expansive discharge into the natural casing at a sufficient volume and velocity to provide the primary energy within the natural casing to move the natural casing forwardly off of the discharge end of the stuffing tube. The casing is extended through a hollow chuck. A resilient brake element in the chuck is extended around the casing to impede its longitudinal movement. A thrust collar is slidably mounted on the stuffing tube and is intermittently manually pushed against the casing to limit the length thereof but is insufficient to create compression pressure thereon.

An apparatus for filling meat emulsion into an elongated natural or artificial casing has (a) a casing filling station including a stuffing tube for supporting a casing to be filled with meat emulsion, (b) a casing hopper to serve as a reservoir for a plurality of shirred artificial casings mounted on the machine adjacent the casing filling station for delivery of shirred artificial casings for mounting on the stuffing tube, and (c) means on the machine for moving the casing hopper away from its position adjacent the casing filling station when natural casings are placed on a stuffing tube in the casing filling station.

DESCRIPTION OF THE PREFERRED EMBODIMENT

Figures 1, 2:
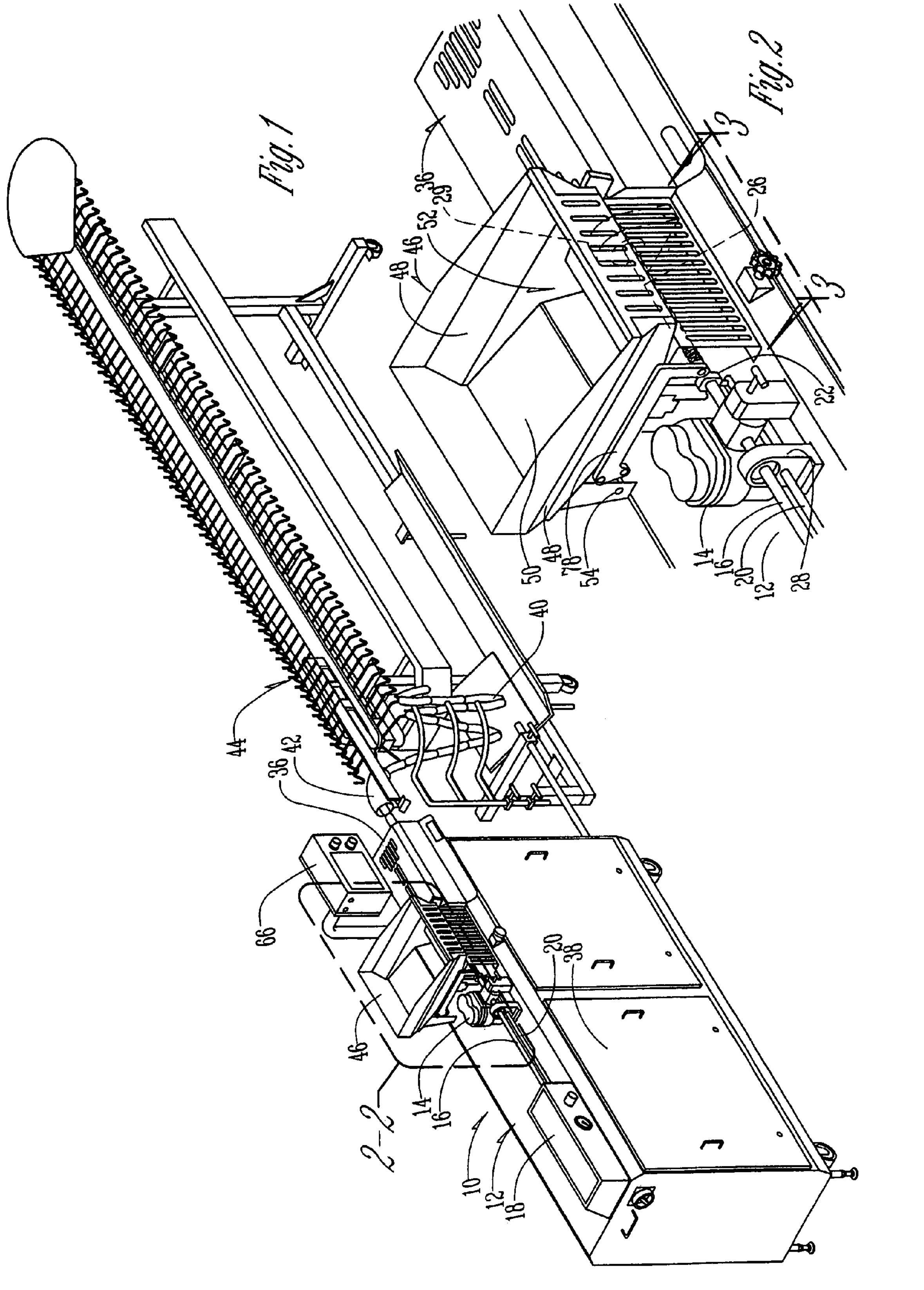
FIG. 1 is a perspective view of a prior art sausage encasing machine which shows the general relationship of the major components of the sausage making machine of this invention.
FIG. 2 is an enlarged scale perspective view of the prior art machine of FIG. 1 taken on line 2—2 of FIG. 1.
Figure 3:
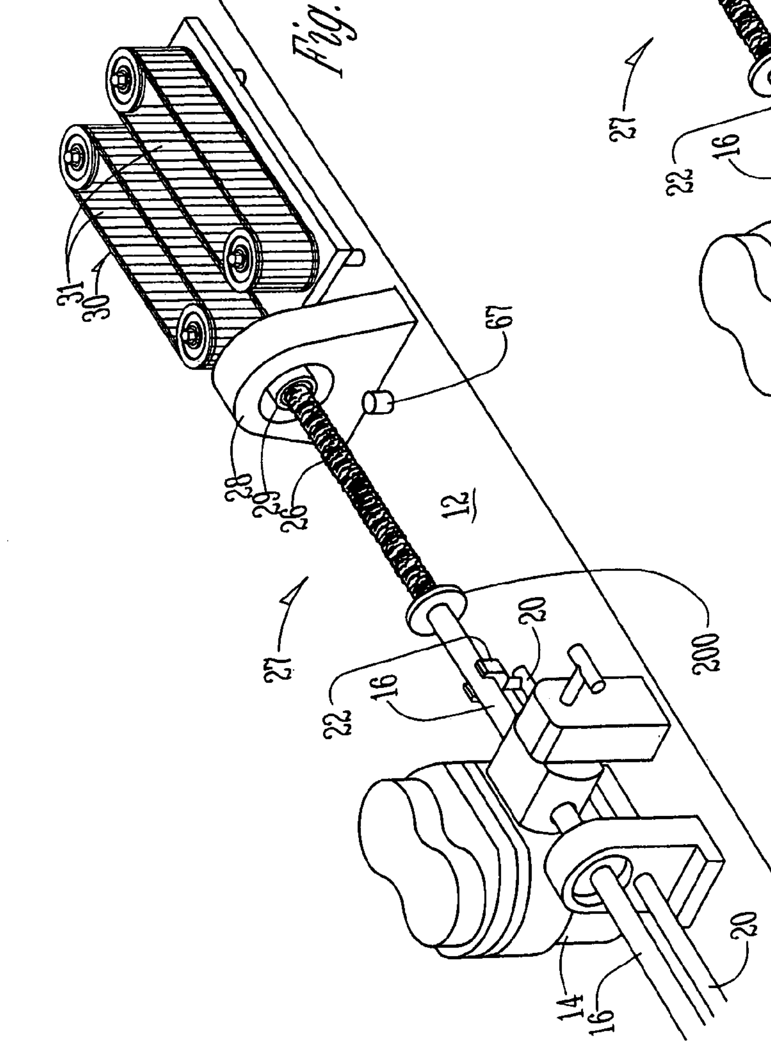
FIG. 3 is an enlarged scale perspective view of the machine of FIG. 2 using conventional shirred casings.
Figure 3A:
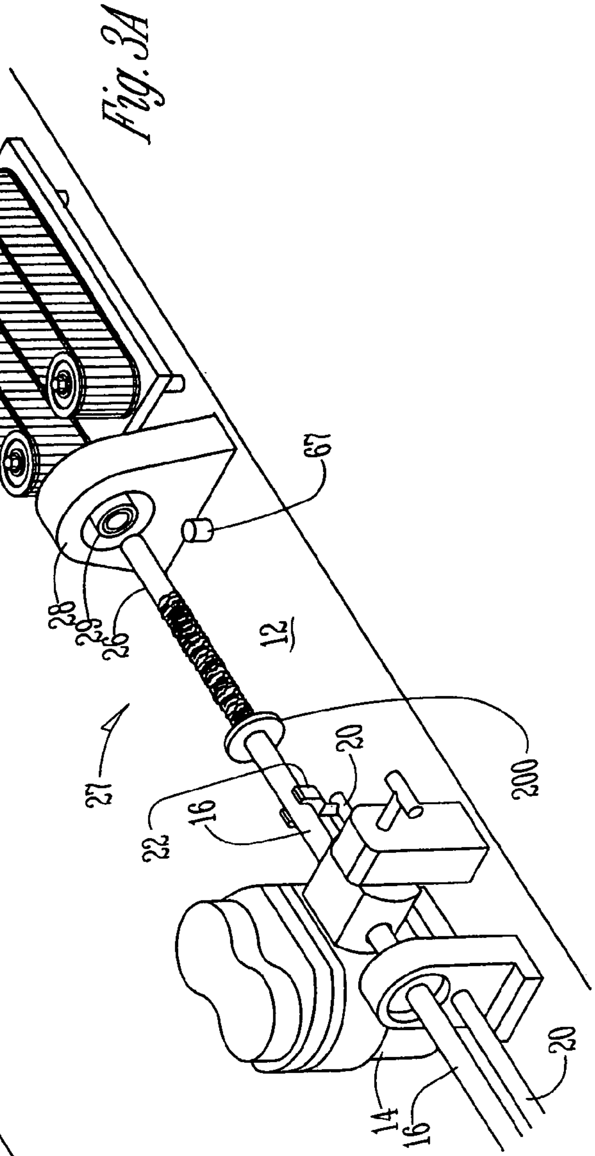
FIGS. 3A and 3B are enlarged scale perspective views of the conventional components of a sausage encasing machine after the natural casing is placed on the stuffing horn.
Figure 3B:
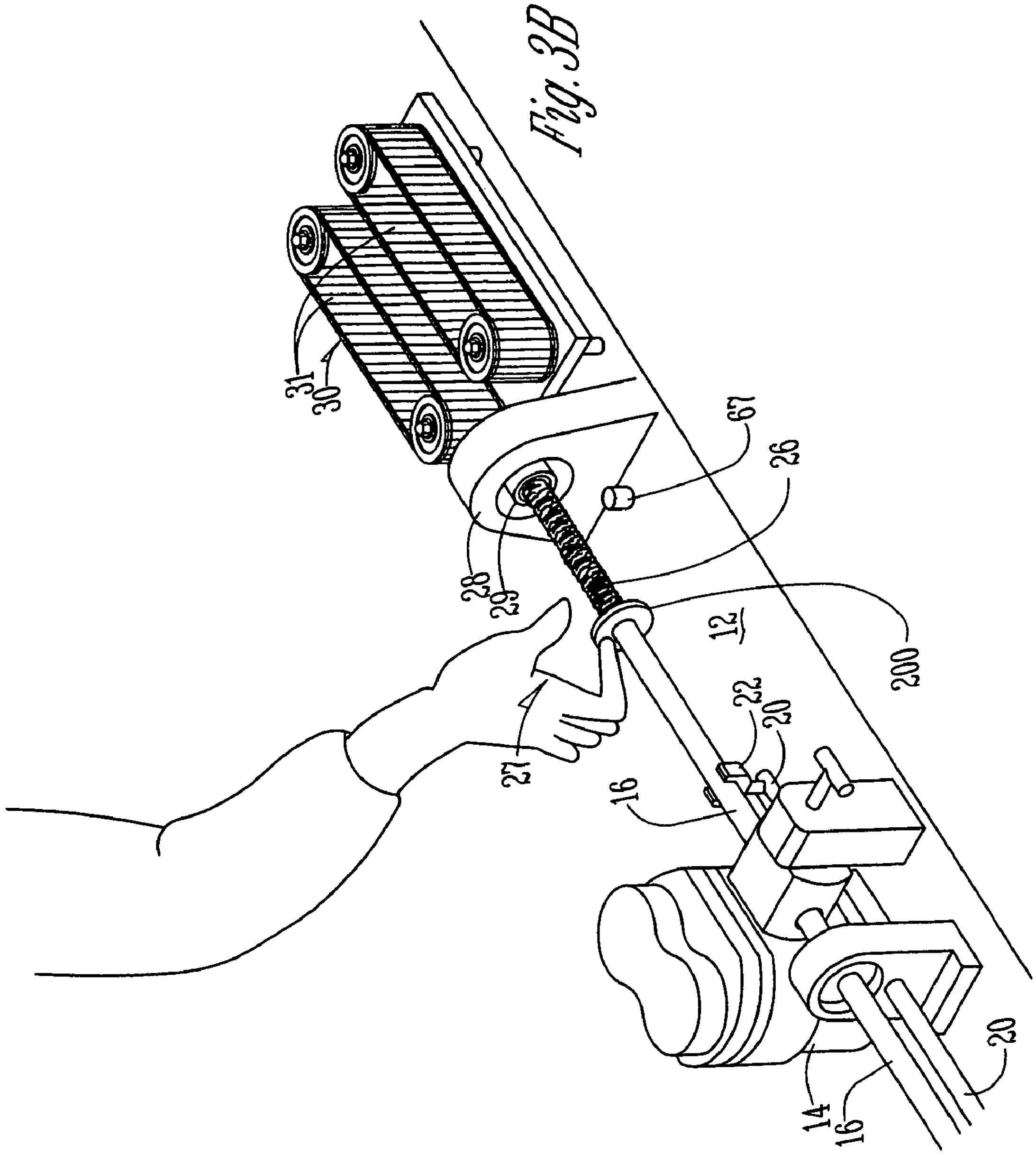
Figure 5:
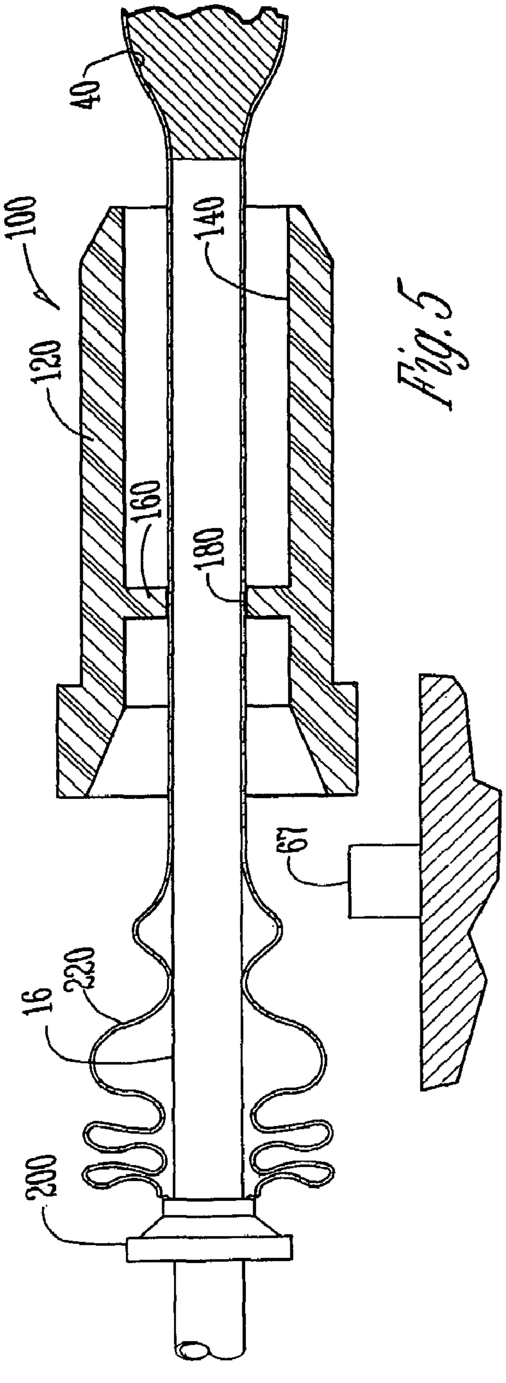
FIG. 5 is a view similar to FIG. 5 during the casing filling process.
Figure 4:
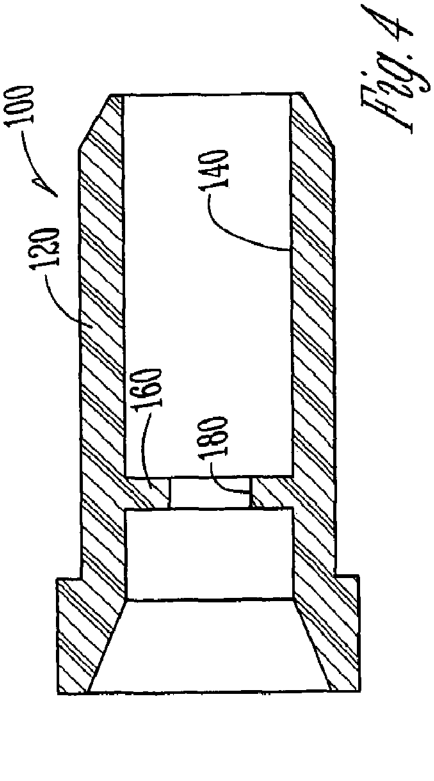
FIG. 4 is an enlarged scale sectional view of the chuck.

A sausage encasing machine 10 (FIG. 1) has a frame 12, and a conventional meat emulsion pump 14 connected to a source of meat emulsion. A stuffing horn 16 is slidably and operably connected to the pump 14 and is longitudinally moveable by air piston 17 contained in housing 18 (FIG. 1). A follower rod 20 is also slidably mounted on the pump 14 parallel to horn 16 and has an actuator 22 on one end slidably mounted on horn 16. Follower rod 20 is powered by air piston 24 located in housing 18. An elongated shirred sausage casing 26 is conventionally mounted on horn 16. The forward end of horn 16 conventionally terminates at casing filling station 27 (FIG. 3) adjacent twister housing 28 which has a hollow rotatable chuck 29 which receives a meat filled casing 26 and rotates it before the meat filled casing moves into conventional linker 30. (FIGS. 4, 5). The chains 31 of linker 30 are rotated by a motor 34 through suitable shafts, gears or belts. The conventional chuck 120 (FIGS. 4, 5) in housing 28 is rotated by a motor (not shown) through suitable shafts and gears. Linker 30 is positioned within housing 36 (FIG. 1). The foregoing components are all conventional and are well known in the art, (see U.S. Pat. No. 3,115,668) and are controlled by computer control 38 (FIG. 1).

The completed strand of sausages 40 exits the machine 10 through horn 42 and the strand is deposited on the chain of hooks of conventional conveyor 44 (FIG. 1).

A casing hopper 46 has tapered sidewalls 48 and a sloping bottom 50 (FIG. 2) which cause shirred casings 26 therein to migrate downwardly towards a bottom opening 52. Hopper 46 is pivoted at 54 (FIG. 2) to any convenient side supports 56. It is also mounted on plate 58 which is pivotally mounted on plate 60 on a vertical axis of pin 61 to be rotated from the forward aperture position of FIG. 2A for filling shirred casings to an inoperative rearward position of FIG. 2B when not in use. A removable lock pin 62 extends between plates 58 and 60 to selectively lock hopper 46 in a forward or rearward position. A PLC 66 is mounted on machine 10 to program and coordinate the components of the machine. The PLC will control the pump 14, the rotation and longitudinal movement of horn 16, the position of hopper 46, and the operation of chuck 120, linker 30 and conveyor 44. A sensor or stop 67 (FIGS. 3–5) adjacent the twister 28 will cause the functions at the filling station 27 to cease when the casing 220 is filled.

A rotatable chuck 100 (FIGS. 5 and 6) has a cylindrical body portion 120 with a longitudinal center bore 140. A resilient brake element 160 is deposed within the center portion of bore 140. The brake 160 has a center bore 180 through which the stuffing horn 16 extends with a natural casing 220 thereon. The brake 160 provides a longitudinal drag on the natural casing as described heretofore. The location of the brake 160 in the chuck 100 can vary from one end to the other. It can be integral with the cylindrical housing 120, or can be of a separate material that is affixed in any convenient manner to the interior center bore of the chuck. The friction applied to the natural casing by the brake 160 merely impedes the free flow of the natural casing from the surface of the stuffing tube, but is insufficient to prevent the movement of the natural casing from the stuffing tube provided by the energy of the meat emulsion discharged from the stuffing tube into the interior of the natural casing.

Figure 2A:
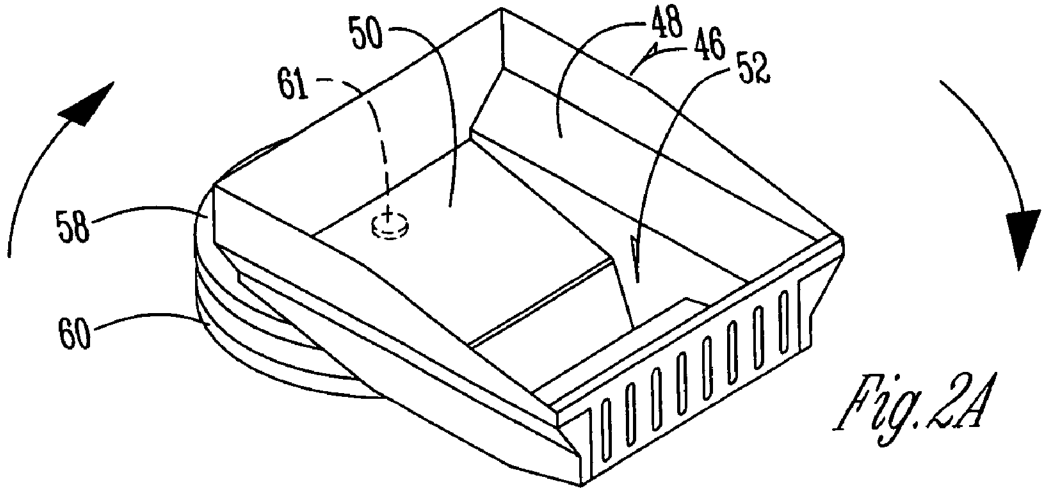
FIGS. 2A and 2B show the casing hopper of FIG. 2 in forward and rearward positions, respectively.
Figure 2B:
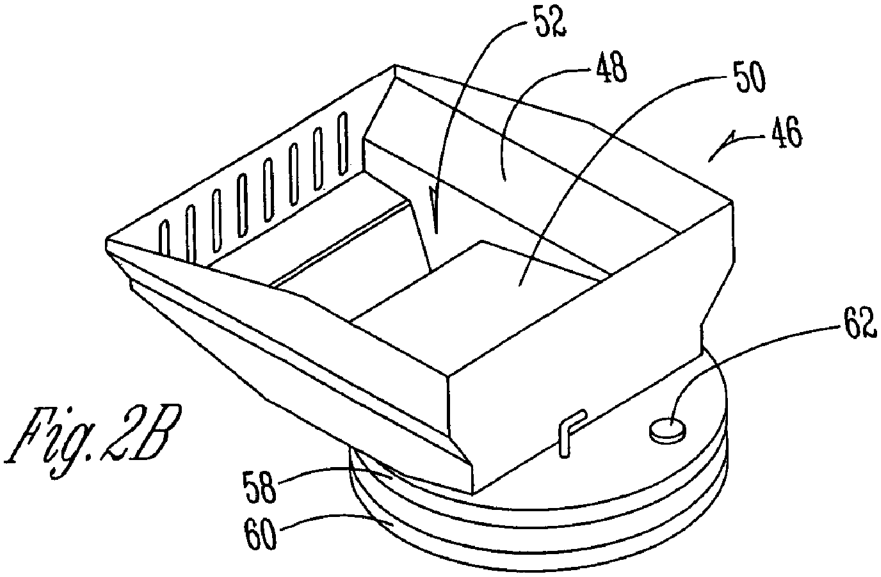

When it is desired to change the machine 10 from filling conventional shirred casings to the filling of natural casings, the lock pin 62 is released and the hopper 46 is rotated about pin 61 from the forward position of FIG. 2B to the inoperative position of FIG. 2A so that it is out of the way for the process of filling natural casings. The thrust collar 200 is slidably mounted on the stuffing tube 16 (FIGS. 3 and 4) behind the natural casing 220. The collar 200 is intermittently manually or automatically pushed against the casing insufficiently to create squeezing or compression pressure thereon but to facilitate the normal forward movement of the casing on the stuffing tube beyond the normal movement of the casing caused by the energy of the emulsion entering the casing. The longitudinal displacement of tube 16 is typically shortened by the PLC 66 when natural casings are being filled. The hopper 46 can be mechanically lifted, hinged, or moved by sliding to move out of the way to facilitate the process for filling the natural casings.

It is therefore seen that this machine will achieve at least all of its stated objectives.

What is claimed:

1. A method for filling a natural hollow elongated casing with a meat emulsion, comprising, providing a casing filling station including a stuffing tube for supporting the casing to be filled with meat emulsion, providing a casing hopper adjacent the casing filling station to serve as a reservoir for a plurality of shirred artificial casings for delivery of shirred artificial casings for mounting on the stuffing tube, and moving the casing hopper away from its position adjacent the casing filling station when natural casings are placed on a stuffing tube in the casing filling station.

2. The method of claim 1 wherein a PLC is provided and senses when the casing hopper is in its position adjacent the casing filling station to thereupon control longitudinal movement of the stuffing tube, to maintain the stuffing tube in a non-automatic extension mode, to hold a follower connected to the stuffing tube in a retracted position, and to maintain the casing hopper in its position adjacent the casing filling station.

3. The method of claim 2 wherein a natural casing is placed on the stuffing tube with the stuffing tube being in a partially retracted position to locate a discharge end of the stuffing tube upstream of the casing filling station; actuating the PLC to cause the stuffing tube to extend through a chuck, and to cause a meat pump to start pumping meat through the stuffing tube when the position of the stuffing tube through the chuck is sensed, and to start rotation of the chuck and the stuffing tube, and to start an operation of linking chains and a conveyor located downstream from the casing filling station; manually advancing the follower and sensing its arrival at a position adjacent a twister mechanism containing the chuck, and causing the PLC to stop operation of the casing filling station.

* * * * *